US012066964B1

(12) United States Patent
Urjan Anandakumar et al.

(10) Patent No.: US 12,066,964 B1
(45) Date of Patent: Aug. 20, 2024

(54) HIGHLY AVAILABLE MODULAR HARDWARE ACCELERATION DEVICE

(71) Applicant: Amazon Technologies, Inc., Seattle, WA (US)

(72) Inventors: Diwakar Urjan Anandakumar, San Jose, CA (US); Bassam Abdel-Dayem, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/548,386

(22) Filed: Dec. 10, 2021

(51) Int. Cl.
  *G06F 11/20* (2006.01)
  *G06F 11/07* (2006.01)
  *G06F 13/40* (2006.01)
  *G06N 20/00* (2019.01)

(52) U.S. Cl.
  CPC ...... *G06F 13/4022* (2013.01); *G06F 11/0745* (2013.01); *G06F 11/079* (2013.01); *G06F 11/2002* (2013.01); *G06N 20/00* (2019.01)

(58) Field of Classification Search
  CPC .... G06F 11/202; G06F 11/2023; G06F 11/20; G06F 11/2025; G06F 13/4022; G06F 13/4068; G06F 11/0745; G06F 11/30; G06F 11/3051
  See application file for complete search history.

(56) References Cited

U.S. PATENT DOCUMENTS

| | | | |
|---|---|---|---|
| 6,975,587 B1 * | 12/2005 | Adamski | H04L 49/557 370/426 |
| 9,904,973 B2 | 2/2018 | Wilt et al. | |
| 9,904,974 B2 | 2/2018 | Wilt et al. | |
| 9,936,611 B1 | 4/2018 | David et al. | |
| 9,996,464 B2 | 6/2018 | Mark et al. | |
| 10,013,377 B2 | 7/2018 | Davis et al. | |
| 10,426,060 B2 | 9/2019 | Beall et al. | |
| 10,430,916 B2 | 10/2019 | Wilt et al. | |
| 10,628,908 B2 | 4/2020 | Wilt et al. | |
| 10,699,367 B2 | 6/2020 | Wilt et al. | |

(Continued)

FOREIGN PATENT DOCUMENTS

EP   3158455 B1   3/2020

*Primary Examiner* — Yolanda L Wilson
(74) *Attorney, Agent, or Firm* — Alexander A. Knapp; Kowert, Hood, Munyon, Rankin & Goetzel, P.C.

(57) ABSTRACT

A system includes a rack with multiple hardware acceleration devices and multiple modular controllers coupled together into a single system implementing one or more servers. Each modular hardware acceleration device includes multiple hardware accelerators, such as graphical processing units, field programmable gate arrays or other specialized processing circuits. In each modular hardware acceleration device, hardware accelerators are communicatively coupled to a multi-port connection device, such as a switch, and also communicatively coupled to at least two external ports. A modular controller of a particular server coordinates operation of hardware accelerators of multiple hardware acceleration devices included in the particular server to provide advanced processing capabilities. Hardware accelerators may be dynamically assigned to particular processing servers to adjust processing capabilities of those servers. A particular server may be assigned one or more standby controller to enhance availability of the server.

20 Claims, 13 Drawing Sheets

(56) References Cited

U.S. PATENT DOCUMENTS

| | | | |
|---|---|---|---|
| 11,055,252 B1 | 7/2021 | Constantinides et al. | |
| 11,210,759 B2 | 12/2021 | Wilt et al. | |
| 11,288,122 B1* | 3/2022 | Fleisher | G06F 1/187 |
| 2002/0095470 A1* | 7/2002 | Cochran | G06F 11/1425 |
| | | | 709/208 |
| 2002/0156918 A1* | 10/2002 | Valdevit | H04L 49/357 |
| | | | 709/238 |
| 2008/0229415 A1* | 9/2008 | Kapoor | H04L 63/14 |
| | | | 726/22 |
| 2013/0046904 A1* | 2/2013 | Hilland | G06F 13/1626 |
| | | | 709/250 |
| 2015/0373115 A1* | 12/2015 | Breakstone | G06F 11/2069 |
| | | | 709/217 |
| 2018/0052793 A1* | 2/2018 | Fang | H04L 41/0806 |
| 2019/0065172 A1* | 2/2019 | Nachimuthu | G06F 11/3442 |
| 2020/0250119 A1 | 8/2020 | Cannata et al. | |

\* cited by examiner

HIGHLY AVAILABLE MODULAR HARDWARE ACCELERATION DEVICE

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Some such servers include a number of hardware acceleration processors that are peripheral to a central processor. These peripheral hardware acceleration processors may include processor hardware configured to perform specialized tasks (for example, a server may include graphics processing units with hardware acceleration processors designed to perform tasks related to graphics processing, machine-learning accelerators designed to perform tasks related to machine learning or storage accelerators or solid state storage devices (SSDs) designed to perform tasks related to storage; other servers may include field programmable gate arrays, or other types of hardware accelerators). Typically, servers include such peripheral hardware acceleration processors in a common chassis of the server along with other server components such as a central processing unit (CPU), memory devices, etc.

Some uses of such servers may require different hardware acceleration capabilities. For example, some graphics processing applications or machine learning applications may require complicated calculations to be performed, thus requiring more hardware acceleration capabilities than other applications. In order to perform these calculations, multiple hardware acceleration processors, such as graphics processing units, may operate together with a central processor to perform these calculations. However, servers that include peripheral processors, such as hardware acceleration processors, in a common chassis of the server along with other server components, may not be configured to operate with other servers to increase hardware acceleration capabilities of the servers. Also, using multiple servers may lead to wasted space in a rack due to redundant server components that are included in the multiple servers.

Figure 1A:
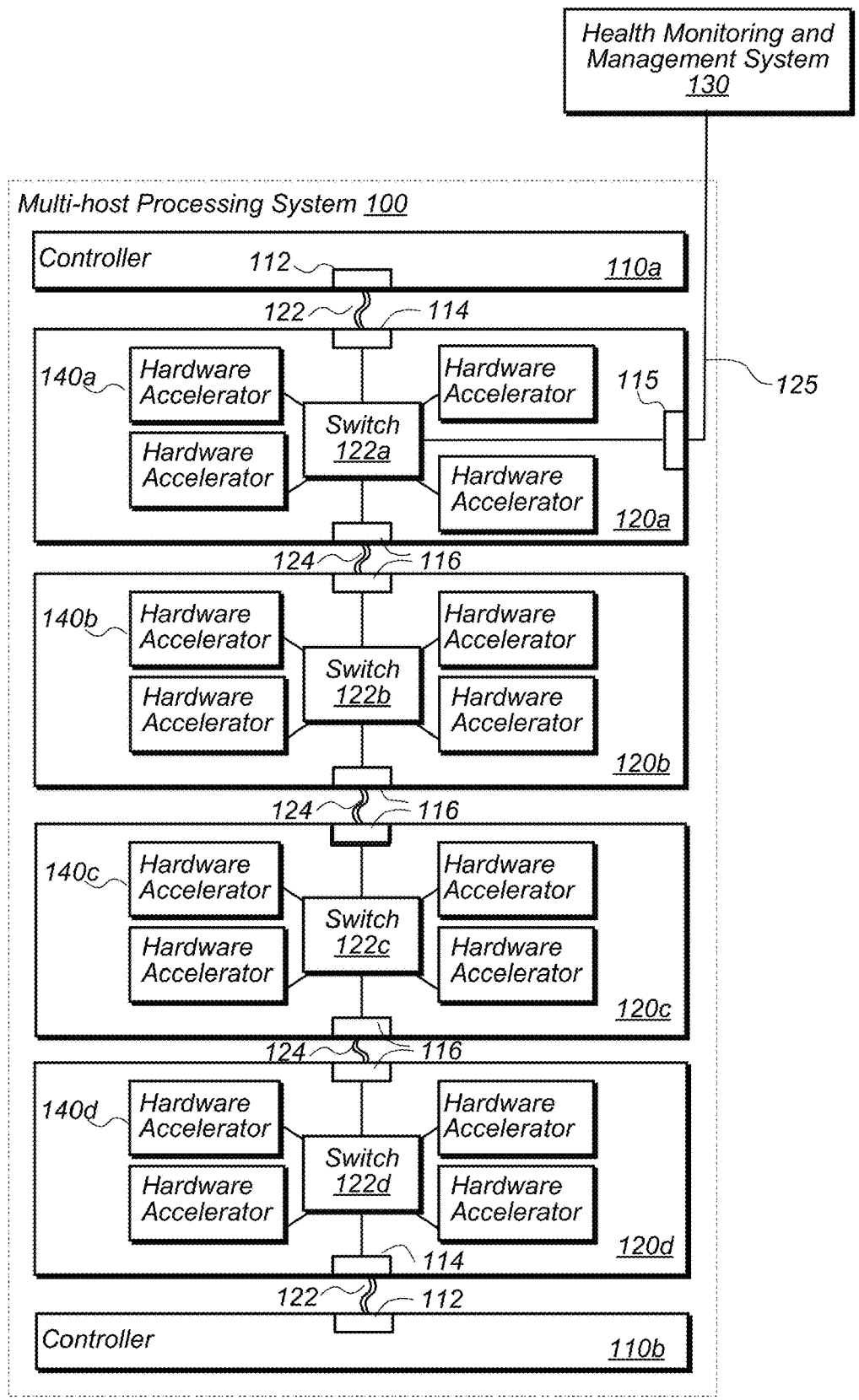
FIG. 1a is a schematic diagram illustrating groups of hardware acceleration devices coupled with respective modular controllers in a rack to form a multi-host processing system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

Various embodiments of computer systems, and systems and methods for performing computing operations, are disclosed. According to one embodiment, a multi-host processing system includes a rack and multiple modular hardware acceleration devices mounted in the rack. The system also includes modular controllers mounted in the rack. Each of the modular hardware acceleration devices includes a chassis configured to mount in the rack, a set of hardware accelerators coupled with the chassis, and multiple ports coupled with the chassis. The sets of hardware accelerators of each modular hardware acceleration device include respective hardware accelerators communicatively coupled to a multi-port connection device, such as an interconnect switch, that interconnects the hardware accelerators with one another via the interconnect switch. The multiple ports of each hardware acceleration device are also communicatively coupled to the respective multi-port connection devices of the respective hardware acceleration devices.

In the system, a group of the hardware acceleration devices are coupled with one another and multiple modular controllers via the ports of the modular hardware acceleration devices to form a multi-host processing system that provides one or more processing servers each with multiple sets of hardware accelerators and at least one modular controller. The multi-host processing system may be monitored, controlled and configured by a management controller which may be included in the multi-host processing system or coupled to it through a management port. Under control of a management controller, the multi-host processing system may be dynamically configured to provide varying numbers of processing servers of differing configurations. In addition, portions of the modular controllers and hardware accelerators may be reserved or held in a standby state to facilitate failure recovery and improve server availability. In this manner, failure events may be detected by the management controller and recovery processes enacted. In some embodiments, these recovery processes may minimize or eliminate any disruption of service by affected processing servers including interruption and restarting of executing application or operating system software executing on the affected processing server.

The modular controller of a particular processing server is configured to coordinate operation of one or more assigned sets of hardware accelerators of the multiple hardware acceleration devices. For example, each modular hardware acceleration device may include four hardware accelerators, such as four graphic processing units (GPUs). A multi-host processing system may include multiple hardware acceleration devices coupled together and controlled by a common modular controller. For example, three modular hardware acceleration devices, each comprising four GPUs, may be coupled together along with a modular controller to form a multi-host processing system with 12 GPUs. Individual ones of these GPUs may be assigned to different processing servers whose operation are coordinated by a modular controller. The modular controller may include a central processing unit (CPU) server that controls the hardware accelerators coupled in the particular processing system as peripheral components of the CPU used to accelerate processing. As discussed in more detail below, other combinations of hardware accelerators and hardware acceleration devices may be included in a multi-host processing system.

According to one embodiment, a modular hardware acceleration device includes a chassis configured to mount in one or more slots of a rack and a set of hardware accelerators coupled with the chassis, wherein respective ones of the plurality of hardware accelerators are communicatively coupled to a multi-port connection device that connects the hardware accelerators with one another. The modular hardware acceleration device also includes multiple ports coupled to the chassis. The multiple ports are also communicatively coupled to the multi-port connection device. Also, the modular hardware acceleration device is configured to couple with one or more additional modular hardware acceleration devices and multiple modular controllers, via the multiple ports, to form a multi-host processing system comprising multiple sets of hardware accelerators, wherein different sets of hardware accelerators of the modular hardware acceleration devices are configured to be controlled by respective ones of the modular controllers to implement multiple processing servers.

According to one embodiment, a method includes coupling two or more modular hardware acceleration devices with one another via respective ports of the modular hardware acceleration devices, wherein each modular hardware acceleration device comprises a set of hardware accelerators, wherein respective ones of the plurality of hardware accelerators are communicatively coupled to a multi-port connection device that interconnects the hardware accelerators of the modular hardware acceleration device with one another, wherein the multi-port connection device is communicatively coupled to a plurality of ports of the modular hardware acceleration device. The method also includes coupling at least one of the two or more modular hardware acceleration devices to multiple modular controllers, wherein the modular controllers are configured to coordinate operation of respective sets of hardware accelerators of the two or more modular hardware acceleration devices to implement multiple processing servers. For example, to form a multi-host processing system, multiple hardware acceleration devices may be coupled together along with multiple modular controllers, where the modular controllers coordinate operation of multiple hardware accelerators of each of the modular hardware acceleration devices.

As used herein, a "cable" includes any cable, conduit, or line that carries one or more conductors and that is flexible over at least a portion of its length. A cable may include a connector portion, such as a plug, at one or more of its ends.

As used herein, "circuit board" means any board or plate that has one or more electrical conductors transmitting power, data, or signals from components on or coupled to the circuit board to other components on the board or to external components. In certain embodiments, a circuit board is an epoxy glass board with one or more conductive layers therein. A circuit board may, however, be made of any suitable combination of materials.

As used herein, "chassis" means a structure or element that supports another element or to which other elements can be mounted. A chassis may have any shape or construction, including a frame, a sheet, a plate, a box, a channel, or a combination thereof. In one embodiment, a chassis is made from one or more sheet metal parts. A chassis for a hardware acceleration device may support circuit board assemblies, power supply units, fans, cables, and other components of the hardware acceleration device.

As used herein, "computing" includes any operations that can be performed by a computer, such as computation, data storage, data retrieval, or communications.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, an application specific integrated circuit, and other programmable circuits. In the various embodiments, memory may include, but is not limited to, a computer-readable medium, such as a random access memory (RAM).

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, to "direct" air includes directing or channeling air, such as to a region or point in space. In various embodiments, air movement for directing air may be induced by creating a high-pressure region, a low-pressure region, or a combination of both. For example, air may be directed downwardly within a chassis by creating a low-pressure region at the bottom of the chassis. In some embodiments, air is directed using vanes, panels, plates, baffles, pipes or other structural elements.

As used herein, "mounting" a particular element on another element refers to positioning the particular element to be in physical contact with the other element, such that the other element provides one or more of structural support, positioning, structural load transfer, stabilization, shock absorption, some combination thereof, or the like with regard to the particular element. The mounted particular element may be positioned to rest upon one or more upper surfaces of the other element, independent of coupling the elements via one or more coupling elements, such as fasteners. In some embodiments, mounting the particular element to another element includes coupling the elements such that the other element provides one or more of structural support, positioning, structural load transfer, stabilization, shock absorption, some combination thereof, or the like with regard to the particular element.

As used herein, a "rack" means a rack, container, frame, or other element or combination of elements that can contain or physically support one or more computer systems. In some embodiments, a rack is a standard 19" rack that conforms to an EIA rack standard.

Some service providers provide computing resources to clients of the service provider by allocating computing resources maintained by the service provider to the client for periods of time or according to various other service arrangements. The allocated computing resources may include physical computing devices that are reserved for exclusive use by the client or may include virtual resources that are implemented on shared physical computing devices that are maintained by the service provider. For example, a service provider may operate a service provider network that includes one or more data centers with computing resources available to be allocated to clients of the service provider.

Some clients of a provider network may request computing resources with specialized or advanced processing capabilities. For example, some clients may desire computing resources with specialized processors configured to perform advanced processing operations, such as graphics calculations, cryptographic calculations, or configured to perform other advanced processing operations.

In order to satisfy customer demand, some data centers may include servers with specialized processors, such as graphical processing units (GPUs), machine-learning accelerators, storage accelerators, cryptographic acceleration circuits, field programmable gate arrays (FPGAs), application specific integrated circuits (ASICs), systems on a chip (SoC), or general-purpose processors, etc. However, client demand for specialized processing capabilities may change over time. Also, specialized processor capability requirements may vary from customer to customer.

Some servers that include specialized processors, such as GPUs, cryptographic acceleration circuits, FPGAs, machine-learning accelerators, storage accelerators, application specific integrated circuits (ASICs), systems on a chip (SoC), or general-purpose processors, etc., may include a fixed number of specialized processors. However, in some instances a client may desire more specialized processing capacity than is included in a server with a fixed number of specialized processors, or in some instances a client may desire less specialized processing capacity than is included in a server with a fixed number of specialized processors.

For example, some servers may include 8 GPUs, 16 GPUs, etc. However, a client may desire specialized processing capability equivalent to 12 GPUs. In such circumstances, a service provider may not be able to fulfill the customer's request if the service provider's servers only include 8 GPUs, otherwise the service provider may over allocate resources to the client. For example, if the service provider's servers include 16 GPUs, the service provider may allocate a 16 GPU server to the client that requested a server with 12 GPU capabilities, thus resulting in an inefficient use of the service provider's resources.

In another example, a service provider may allocate two 8 GPU servers to the client in order to provide the requested processing capacity of 12 GPUs. However, in some data centers, the two 8 GPU servers may not be configured to coordinate operations with each other, thus reducing the efficiency of using the two 8 GPU servers. In addition, the two 8 GPU servers may include other server components in a common chassis, such as central processing units, memory, etc., where the other server components are redundant between the two 8 GPU servers and not necessary to perform the particular application being performed by the client. This also may result in an inefficient allocation of resources of the provider network.

In another example, client demand for specialized processing capability of resources of the provider network made available to clients may change over time. For example, as computing demands change, clients who previously demanded servers with specialized processing capacity equivalent to 8 GPUs may start requesting servers with specialized processing capacity equivalent to 12 GPUs, 16 GPUs, etc. A service provider with a fleet of 8 GPU servers may have to replace the 8 GPU servers with servers with more specialized processing capacity to meet client demands, or may group 8 GPU servers together to meet client demand. However, such an arrangement may lead to redundant server components and an inefficient allocation of resources, as described above.

In some embodiments, a service provider may provide servers with specialized processing capabilities to clients of the service provider using modular hardware acceleration devices and a separate modular controller. A modular hardware acceleration device may include a set of specialized processors, referred to herein as "hardware accelerators." The hardware accelerators included in a modular hardware acceleration device may include GPUs, cryptographic acceleration circuits, machine-learning accelerators, storage accelerators, field programmable gate arrays (FPGAs), application specific integrated circuits (ASICs), systems on a chip (SoC), or general-purpose processors or other specialized processors. A modular hardware acceleration device may also include two or more external ports and a multi-port connection device, such as an interconnect switch that interconnects the hardware accelerators and the external ports of the modular hardware acceleration device. For ease of illustration, a multi-port connection device is referred to herein as a "switch." However, in some embodiments, a multi-port connection device may include a switch integrated with other components such that the multi-port connection device includes functionality in addition to switching functionality. For example, in some embodiments switching functionality may be integrated with a hardware accelerator, such as an ASIC chip with multiple ports.

In some embodiments, the external ports may be backplane connectors, mini SAS HD ports, external PCIe ports, thunderbolt ports, USB-C ports or other types of high speed ports and the interconnect switch may be a peripheral component interconnect express (PCIe) switch. Multiple modular hardware acceleration devices may be coupled together, via their respective ports, with a separate controller to form a particular processing system. The particular processing system may function as a server with specialized processors, but may also be adjustable so that additional hardware acceleration devices may be added to the particular processing system to increase the specialized processing capability of the particular processing system. Also, hardware acceleration devices may be decoupled from a particular processing system and coupled to another particular processing system to re-balance specialized processing capacity.

Figure 1B:
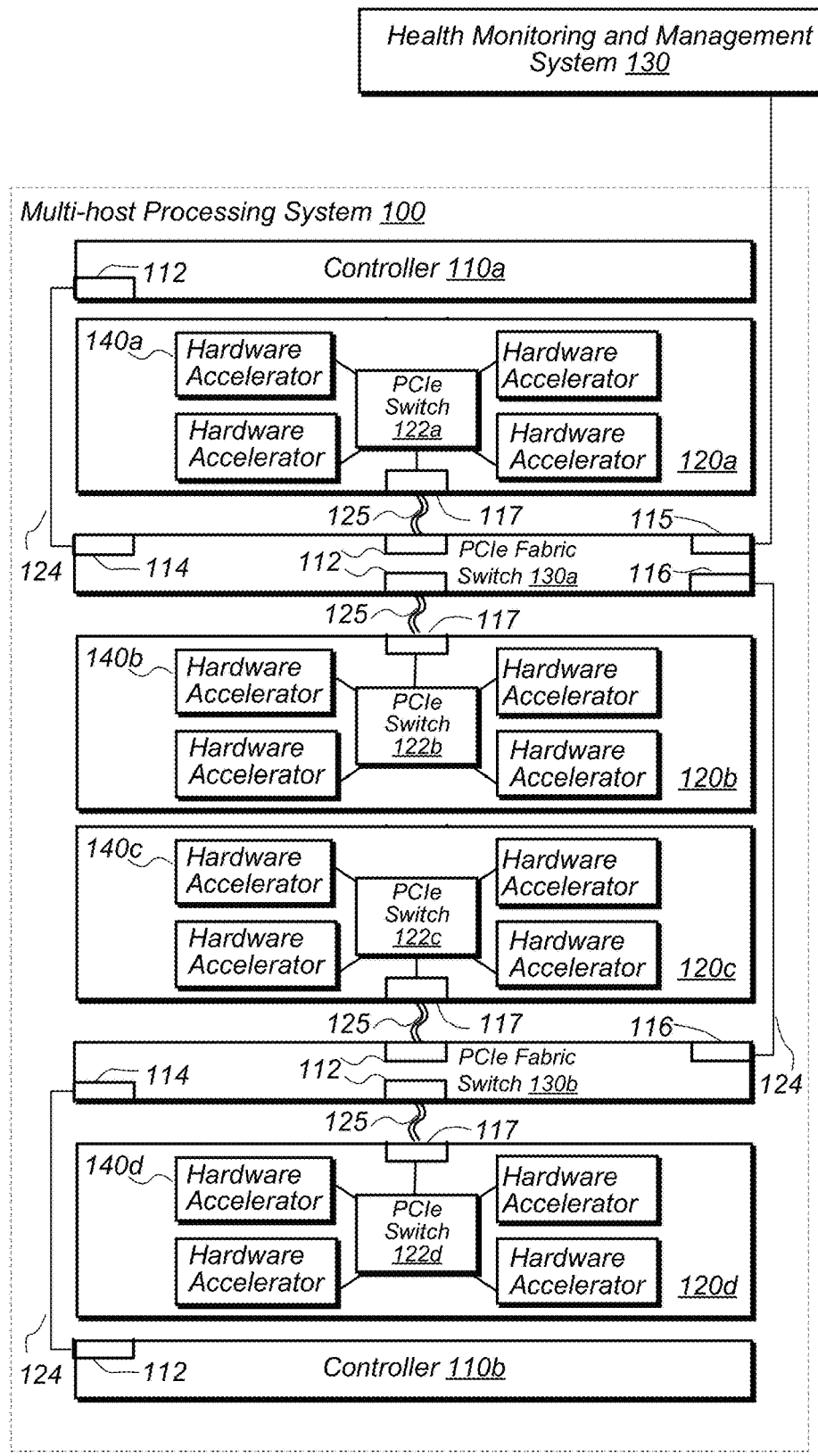
FIG. 1b is a schematic diagram illustrating groups of hardware acceleration devices coupled, according to a peripheral interconnect express (PCIe) standard, with respective modular controllers in a rack to form a multi-host processing system, according to some embodiments.
Figure 1C:
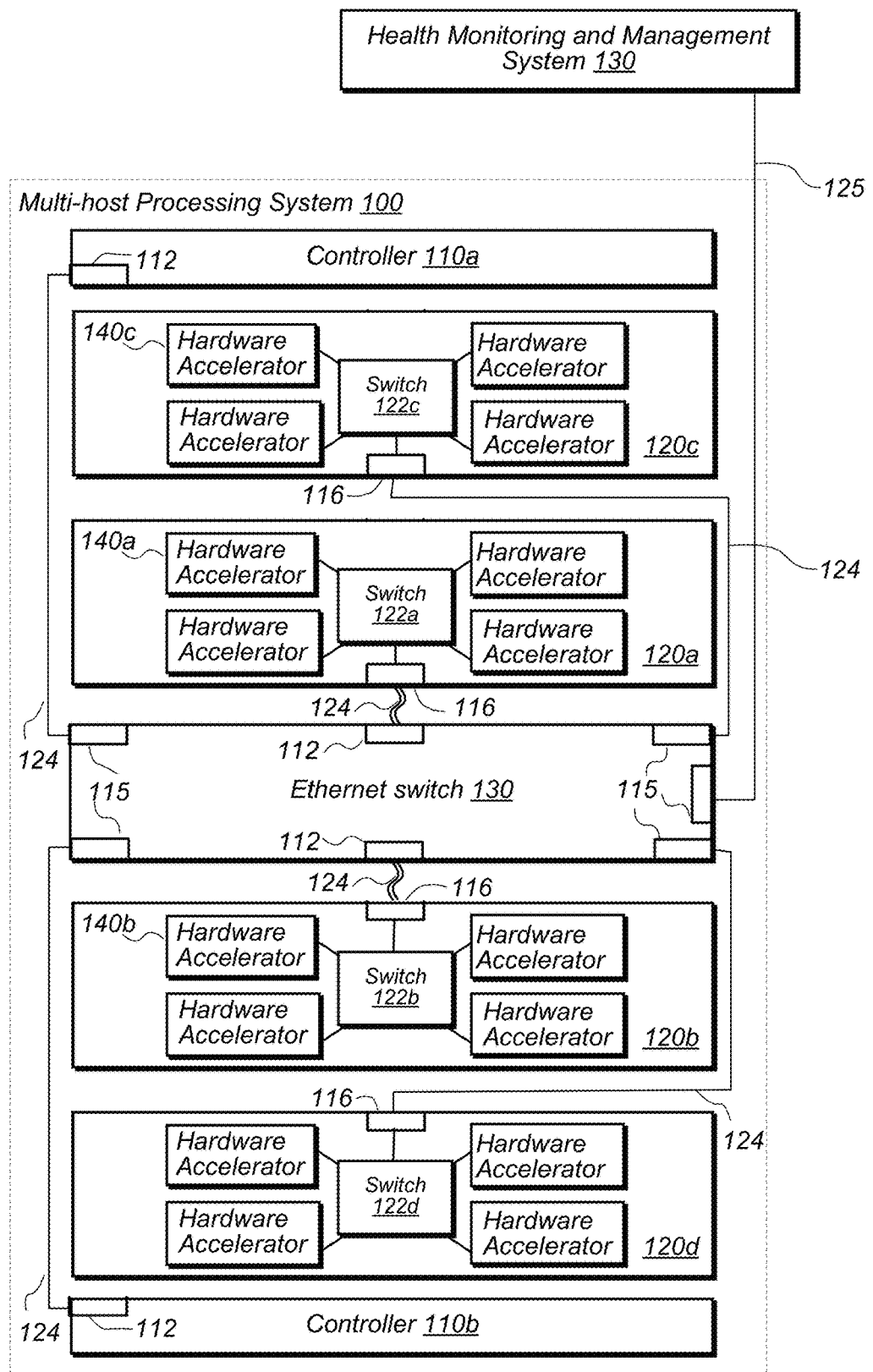
FIG. 1c is a schematic diagram illustrating groups of hardware acceleration devices coupled, according to the Institute of Electrical and Electronics Engineers (IEEE) 802.3 ethernet standard, with respective modular controllers in a rack to form a multi-host processing system, according to some embodiments.

FIGS. 1a, 1b and 1c are schematic diagrams illustrating groups of hardware acceleration devices coupled with respective controllers in a rack, according to various embodiments. In some embodiments, a system, as shown in FIG. 1a, includes a rack with multiple modular hardware acceleration devices and modular controllers mounted in the rack. For example, FIG. 1a schematically illustrates rack 190 that includes hardware acceleration devices 120 including devices 120a, 120b, 120c and 120d mounted in rack 190. Modular controllers 110 include controllers 110a and 110b, which are also mounted in rack 190.

Each of hardware acceleration devices 120 includes hardware accelerators 140 such as accelerators 140a, 140b, 140c and 140d. In some embodiments, hardware accelerators 140 may be graphics processing units (GPUs), cryptographic processing circuits, machine-learning accelerators, storage accelerators, field programmable gate arrays (FPGAs), application specific integrated circuits (ASICs), application specific integrated circuits (ASICs), systems on a chip (SoC), or general-purpose processors or other types of specialized processors. In some embodiments, hardware accelerators 140 may be general purpose processors. In some embodiments, hardware accelerators 130 may be different types of hardware accelerators. For example, hardware accelerators 140a may comprise GPUs, whereas hardware accelerators 140b may comprise FPGAs.

In FIG. 1a, hardware acceleration devices 120 are communicatively coupled with one another via cables 124 that are coupled with respective external ports 116 of hardware acceleration devices 120. In addition, some or all hardware acceleration devices 120 are communicatively coupled with modular controllers 110 via cables 122 coupled with external ports 114 of modular hardware acceleration devices 120 and ports 112 of modular controller 110. Modular hardware acceleration devices 120 coupled with modular controller 110 may form a particular processing system in rack 102, such as multi-host processing system 100.

In some embodiments, a health monitoring and management system 130 may be communicatively coupled to one or more modular hardware acceleration devices 120 via port(s) 115 using via cable(s) 125. While only one connection between the health monitoring and management system 130 and the multi-host processing system 100 is shown in FIG. 1a, in some embodiments multiple connections to one or more than one of the hardware acceleration devices 120 may be employed and the example shown in FIG. 1a is not intended to be limiting.

Furthermore, while single connections are shown between modular hardware acceleration devices 120, these connections may employ redundant ports and cables to improve availability, in some embodiments. In addition, while FIG. 1a shows only one or two connections between hardware acceleration devices 120, such as device 120b, and other hardware acceleration devices 120, such as devices 120a and 120c. The example provided is simplified for clarity and is not intended to be limiting as any number of connections between hardware acceleration devices 120 may be employed. Various topologies for these connections may be employed, such as star or ring topologies, providing protection against one or more failures of devices, ports, switches, cables, etc.

In some embodiments, a multi-host processing system 100 comprising multiple hardware acceleration devices and multiple modular controllers may function as a one or more servers, each controlled by a modular controller. For example, a modular controller, such as modular controller 110a, may include various server components, such as a central processor, network interface card, memory, etc. and hardware accelerators 140a and 140c of hardware acceleration devices 120a and 120c may be configured by the health monitoring and management system 130 to be communicatively coupled with a bus of modular controller 110a, such that hardware accelerators 140a and 140c of modular hardware acceleration devices 120a and 120c appear to other components of modular controller 110a to be peripheral processors coupled on a common bus of modular controller 110a. In a similar manner, additional hardware accelerators 140b and 140d of hardware acceleration devices 120b and 120d may appear to other components of modular controller 110b to be peripheral processors coupled on a common bus of modular controller 110b, in some embodiments. In this manner, the multi-host processing system 100 may be configured by the health monitoring and management system 130 to provide one or more processing hosts with varying numbers of hardware accelerators 140 assigned to each processing host, with configuration and reconfiguration of the processing hosts dynamically configurable.

Furthermore, additional modular controllers 110 (not shown) may be configured by the health monitoring and management system 130 to be standby controllers for modular controllers 110a and 110b to protect against failures of modular controllers 110, ports 112, and cables 122.

Each of hardware acceleration devices 120 also includes an interconnect switch 122 and external ports 114, 115 and 116. In some embodiments, hardware accelerators 140 and respective interconnect switches 122 of each modular hardware acceleration device 110 may be configured to operate in accordance with a peripheral interconnect express (PCIe standard). PCI Express (also referred to as PCIe) is a high-speed serial computer expansion bus standard. In general, a PCIe bus supports full-duplex communication between any two endpoints, with data encapsulated in packets.

For example, a hardware accelerator of hardware acceleration device 120 may be configured to send and receive encapsulated data packets with a hardware accelerator of hardware acceleration device 114 in accordance with the PCIe standard and using respective interconnect switches 122 as PCIe interconnect switches. A CPU of a modular controller may coordinate operations of multiple hardware accelerators in multiple hardware acceleration devices coupled together in a particular processing system that includes the modular controller. In some embodiments, a particular processing system may include more than one modular controller coupled with multiple hardware acceleration devices.

In embodiments employing the PCIe standard, interconnect ports 116 may be fabric expansion ports or non-transparent bridges (NTBs) while interconnect ports 114 may be upstream PCIe ports. Furthermore, these ports may be configurable as fabric expansion ports or upstream ports by the health monitoring and management system 130. In these embodiments, port 115 may also be an upstream port, either dedicated to switch monitoring and management functions or configurable as an upstream port or fabric expansion port, as in ports 114 and 116.

In some embodiments, components of the multi-host processing system 100 may be configured to operate in accordance with the Institute of Electrical and Electronics Engineers (IEEE) 802.3 ethernet standard. IEEE 802.3 ethernet (also referred to as ethernet) is a high-speed computer networking standard. In general, ethernet supports full-duplex communication between any peer nodes, with data encapsulated in packets.

For example, a hardware accelerator of hardware acceleration device 120 may be configured to send and receive encapsulated data packets with a hardware accelerator 140 of hardware acceleration device 120 in accordance with the ethernet standard and using respective interconnect switches 122 as ethernet switches. A CPU of a modular controller may coordinate operations of multiple hardware accelerators 140 in multiple hardware acceleration devices 120 coupled together in a particular processing system that includes the modular controller 110. In some embodiments, a particular processing system may include more than one modular controller 110 coupled with multiple hardware acceleration devices 120.

In embodiments employing the ethernet standard, interconnect ports 114, 115 and 116 may all be ethernet ports communicating on a common ethernet network. In some embodiments, interconnect ports 114, 115 and 116 may be similar ethernet ports while in other embodiments these ports may differ in implementation and capability. For example, in some embodiments, hardware acceleration device interconnection ports 116 may be 10 Gb ethernet ports while ports 114 and 115 may be 1 Gb ethernet ports. Furthermore, ports may be configurable for capability by the health monitoring and management system 130. In other embodiments, additional ethernet speeds may be employed such as 100 Gb, 400 Gb, 800 Gb and additional speeds as ethernet standards evolve. These examples are not intended to be limiting and other combinations of ethernet speeds for the various ethernet ports may be employed.

In some embodiments, the components of the multi-host processing system 100 may be configured to operate in accordance with the Institute of Electrical and Electronics Engineers (IEEE) 802.3 ethernet standard. IEEE 802.3 ethernet (also referred to as ethernet) is a high-speed computer networking standard. In general, ethernet supports full-duplex communication between any peer nodes, with data encapsulated in packets.

In still other embodiments, a hardware accelerator of hardware acceleration device 120 may be configured to send and receive encapsulated data packets with a hardware accelerator of hardware acceleration device 114 in accordance with another communication standard such as, Rapid IO, or other suitable standards.

In some embodiments, a multi-host processing systems 100 in a single rack may implement multiple processing servers (not shown). For example, a first processing server of the multi-host processing system 100 may include six total hardware accelerators 140, whereas a second processing server may include twelve total hardware accelerators 140. The Health Monitoring and Management System 130 may assign and add or subtract other hardware accelerators for a particular processing server to balance hardware acceleration capacity between the particular processing servers.

In some embodiments, a particular processing server may include more than one modular controller. For example, a first processing server may include two modular controllers 110 including a primary controller and a standby controller. Additionally, the multi-host processing system 100 may include one or more modular controllers not assigned to any processing server. Instead, the Health Monitoring and Management System 130 may configure an unassigned modular controller 110 to the first processing server responsive to detecting a failure event that makes the primary modular controllers 110 assigned to the first processing server unavailable.

In FIG. 1a, modular hardware acceleration devices 140 are illustrated as each comprising four hardware accelerators, two external ports, and a single interconnect switch. However, in some embodiments, a modular hardware acceleration device may include more or less hardware accelerators, more or less external ports, or may include multiple interconnect switches.

For ease of illustration in FIG. 1a, hardware accelerators and switches of the respective hardware acceleration devices have been illustrated vertically above one another. However, hardware accelerators and switches of the respective hardware acceleration devices may be mounted on a circuit board so that the hardware accelerators and switches are in a common horizontal plane when mounted in a rack. For example, hardware accelerators and switches of a hardware acceleration device may be mounted on a circuit board in a chassis configured to mount in a 1 U slot in a server rack, such as rack 190.

FIG. 1b is schematic diagram illustrating groups of hardware acceleration devices coupled, according to a peripheral interconnect express (PCIe) standard, with respective controllers in a rack, according to some embodiments. A system includes a rack with multiple modular hardware acceleration devices, PCIe fabric switches and modular controllers mounted in the rack. For example, FIG. 1b schematically illustrates rack 190 that includes hardware acceleration devices 120 including devices 120a, 120b, 120c and 120d mounted in rack 190. Modular controllers 110 include controllers 110a and 110b, also mounted in rack 190, and PCIe fabric switches 130a and 130b, also mounted in rack 190.

In addition to the various components disclosed above in FIG. 1a, the multi-host processing system 110 of FIG. 1b include PCIe fabric switches 130 which interconnect via PCIe fabric ports 116 via PCIe fabric cable 124. The switches 122, including 122a, 122b, 122c and 122d, are PCIe switches conforming to the PCIe standard and connected to the PCIe fabric of the PCIe fabric switches 130 via PCIe upstream ports 117 using PCIe cables 125. The multi-host processing system 110 of FIG. 1b, therefore, varies from a PCIe embodiment of the system in FIG. 1a in that the PCIe fabric is isolated in the PCIe fabric switches, allowing the modular hardware acceleration devices 120 to be implemented with conventional PCIe switches 122 rather than PCIe fabric switches, as would be used in a PCIe embodiment of FIG. 1a.

FIG. 1c is schematic diagram illustrating groups of hardware acceleration devices coupled, the Institute of Electrical and Electronics Engineers (IEEE) 802.3 ethernet standard, with respective controllers in a rack, according to some embodiments. A system includes a rack with multiple modular hardware acceleration devices, ethernet switches and modular controllers mounted in the rack. For example, FIG. 1c schematically illustrates rack 190 that includes hardware acceleration devices 120 including devices 120a, 120b, 120c and 120d mounted in rack 190. Modular controllers 110 include controllers 110a and 110b, also mounted in rack 190, and ethernet switch 130, also mounted in rack 190.

In addition to the various components disclosed above in FIG. 1a, the multi-host processing system 110 of FIG. 1c may include an ethernet switch 130. The switches 122, including 122a, 122b, 122c and 122d, may be ethernet switches conforming to the IEEE 802.3 ethernet standard and connected to the ethernet switch 130 via ethernet ports 116 using ethernet cables 124. Furthermore, the switches 122, including 122a, 122b, 122c and 122d, may be conventionally wired switches or may employ optical interconnects complying with an optical physical interface layer of the ethernet standard or other communications standard. In some embodiments, Ethernet switch 130 may be an additional switch, in addition to a top of rack (TOR) switch for a rack hosting multi-host processing system 100. For example, ethernet switch 130 may provide switch functionality between controller and hardware accelerations and a TOR (not shown) switch may perform network operations to connect controller, such as controllers 110a or 110b to other systems or networks.

Figure 2:
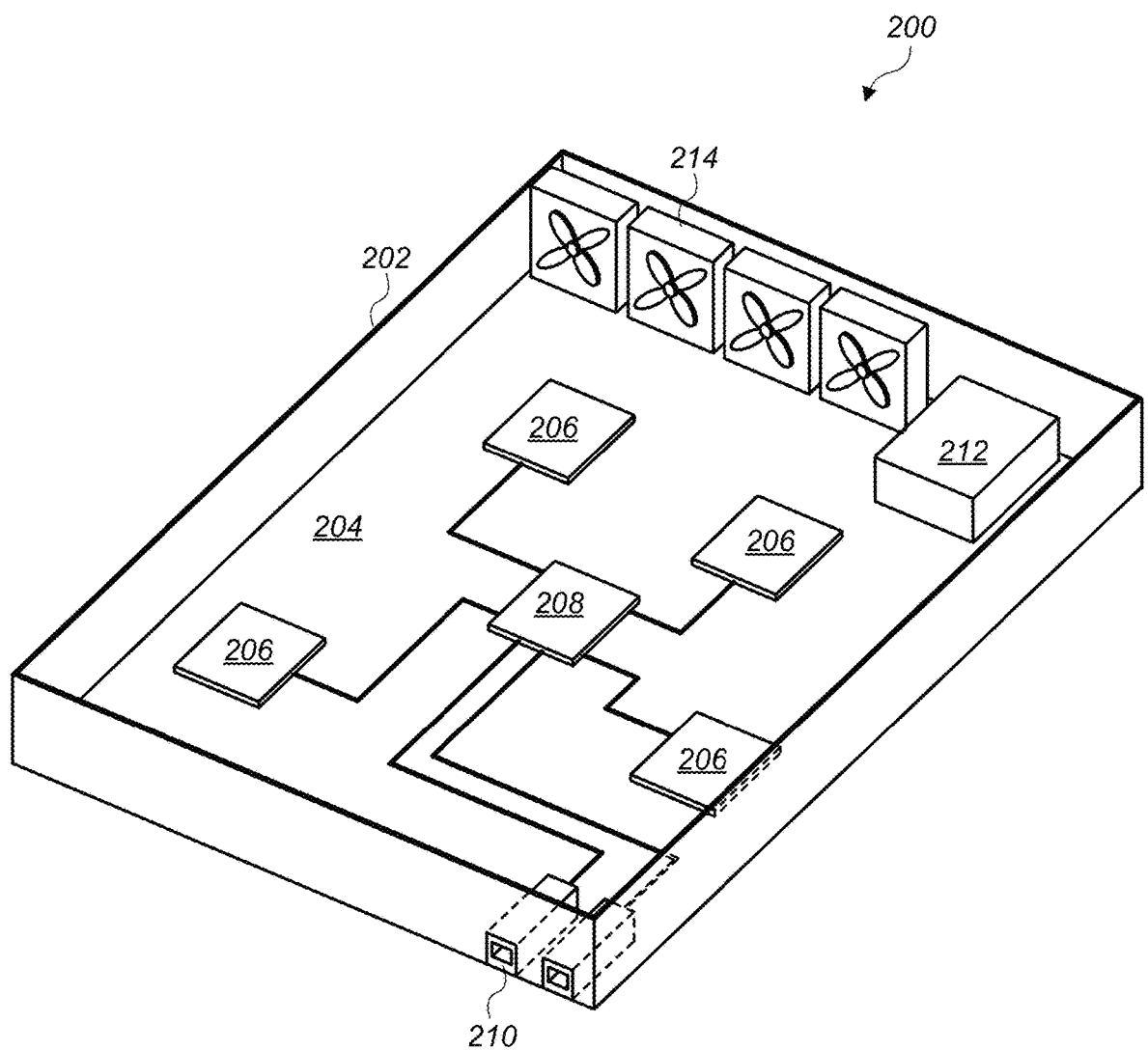
FIG. 2 illustrates a perspective view of a hardware acceleration device, according to some embodiments.

FIG. 2 illustrates a perspective view of a hardware acceleration device, according to some embodiments. Hardware acceleration device 200 includes chassis 202 with circuit board 204 mounted within chassis 202. Four hardware accelerators 206 are mounted on circuit board 204 and communicatively coupled to interconnect switch 208. External ports 210 are also mounted on circuit board 204 and communicatively coupled to interconnect switch 208. In FIG. 2, interconnect switch 208, hardware accelerators 206 and external ports 210 are coupled together via circuit tracing. In some embodiments, interconnect switch 208, hardware accelerators 206 and external ports 210 may be coupled together using a different medium, such as a cable or other connector. Hardware acceleration device 200 also includes fans 214 and power supply 212. In some embodiments, power supply 212 may supply power to hardware accelerators 206 and interconnect switch 208, via circuit board 204. In some embodiments power supply 212 may be coupled to hardware accelerators 206 and interconnect switch 208 via one or more cables.

In some embodiments, a hardware acceleration device may be air cooled. For example, fans 214 may direct air flow through hardware acceleration device 200 to cool hardware accelerators 206 and interconnect switch 208. In some embodiments, a hardware acceleration device, may be liquid cooled. Also, in some embodiments, a hardware acceleration device may include more or less hardware accelerators, and may include more or less ports. Any of the hardware acceleration devices 120a through 120d may be a hardware acceleration device 200 as described in FIG. 2.

Figure 3:
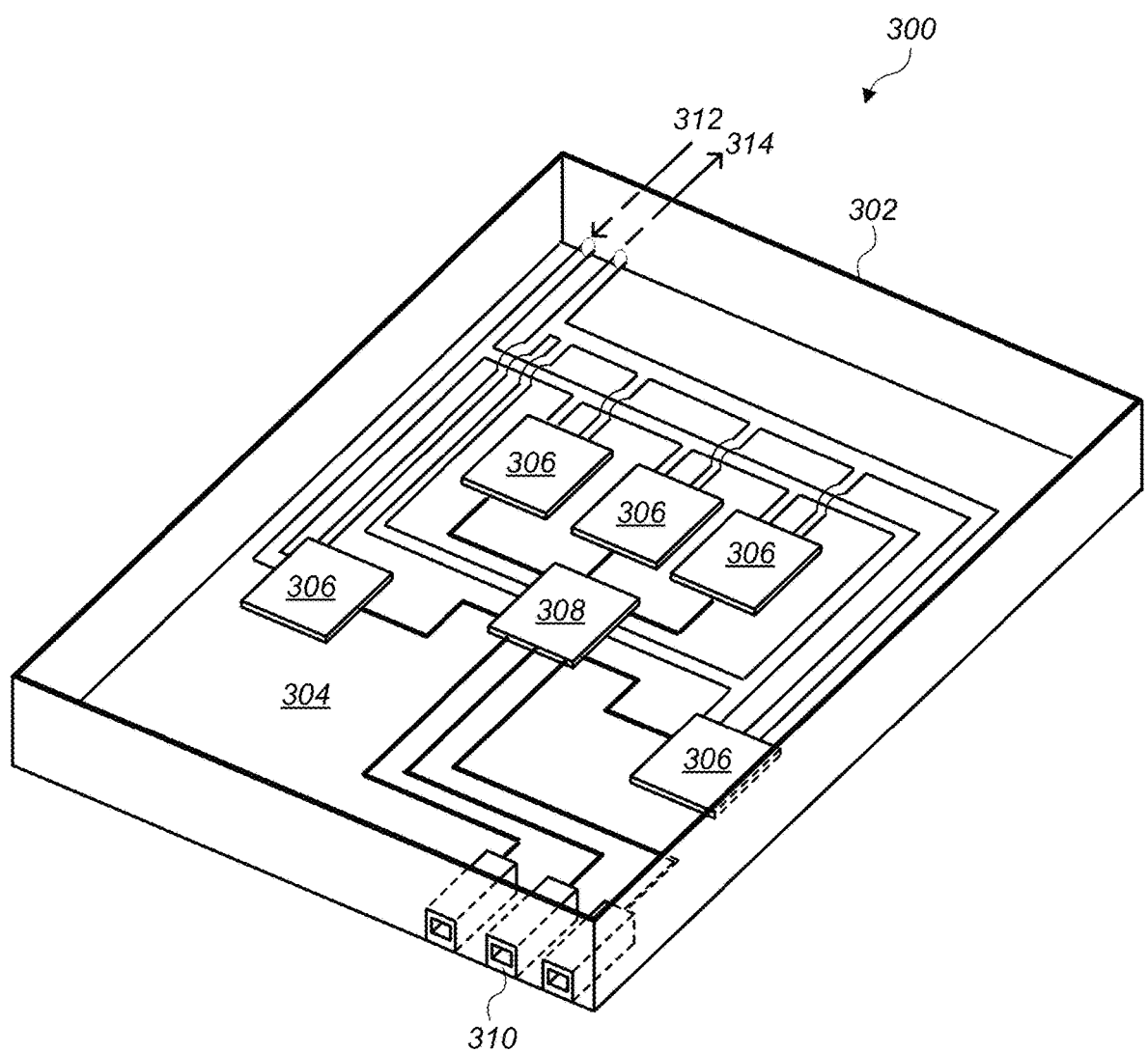
FIG. 3 illustrates a perspective view of a hardware acceleration device, according to some embodiments.

FIG. 3 illustrates another perspective view of a hardware acceleration device, according to some embodiments. Hardware acceleration device 300 includes chassis 302 and circuit board 304 mounted within chassis 302. Five hardware accelerators 306 are mounted on circuit board 304. Interconnect switch 308 and external ports 310 are also mounted on circuit board 304. Hardware accelerators 306, interconnect switch 308, and external ports 310 are communicatively coupled with each other via circuit tracings of circuit board 304. In some embodiments, hardware accelerators 306, interconnect switch 308, and external ports 310 may be communicatively coupled via other means, such as via respective cables. Hardware acceleration device 300 is liquid cooled. Cool liquid flows into hardware acceleration device 300 via cooling inlet 312. The liquid flows over or through respective ones of hardware accelerators 306 and interconnect switch 308. After removing heat from the respective ones of hardware accelerators 306 and interconnect switch 308, the liquid flows out of hardware acceleration device 300 via cooling outlet 314. In some embodiments cooling inlet 312 and cooling outlet 314 may couple with a cooling supply and return system in a rack or a data center in which hardware acceleration device 300 is mounted. Any of the hardware acceleration devices 120a through 120d described in FIG. 1a may be a hardware acceleration device 300 as described in FIG. 3.

Figure 4A:
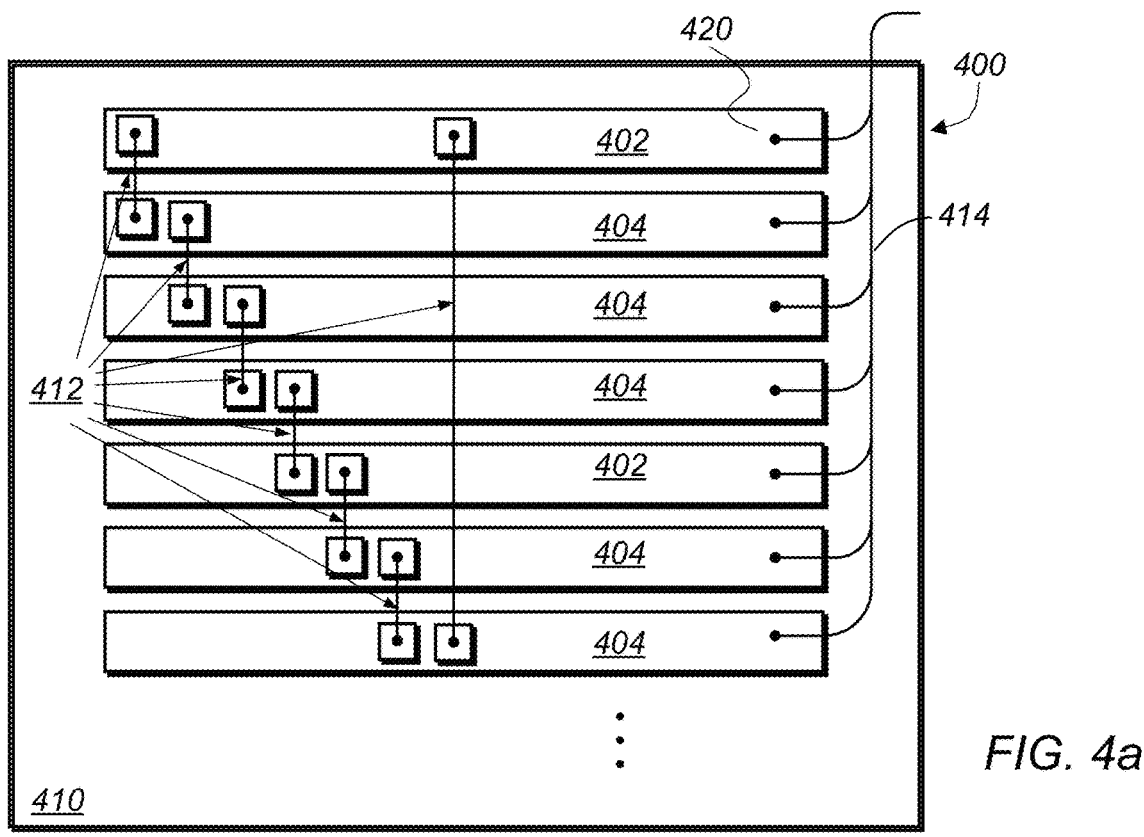
FIG. 4a illustrates a view of hardware acceleration devices mounted in a rack, according to some embodiments.
Figure 4B:
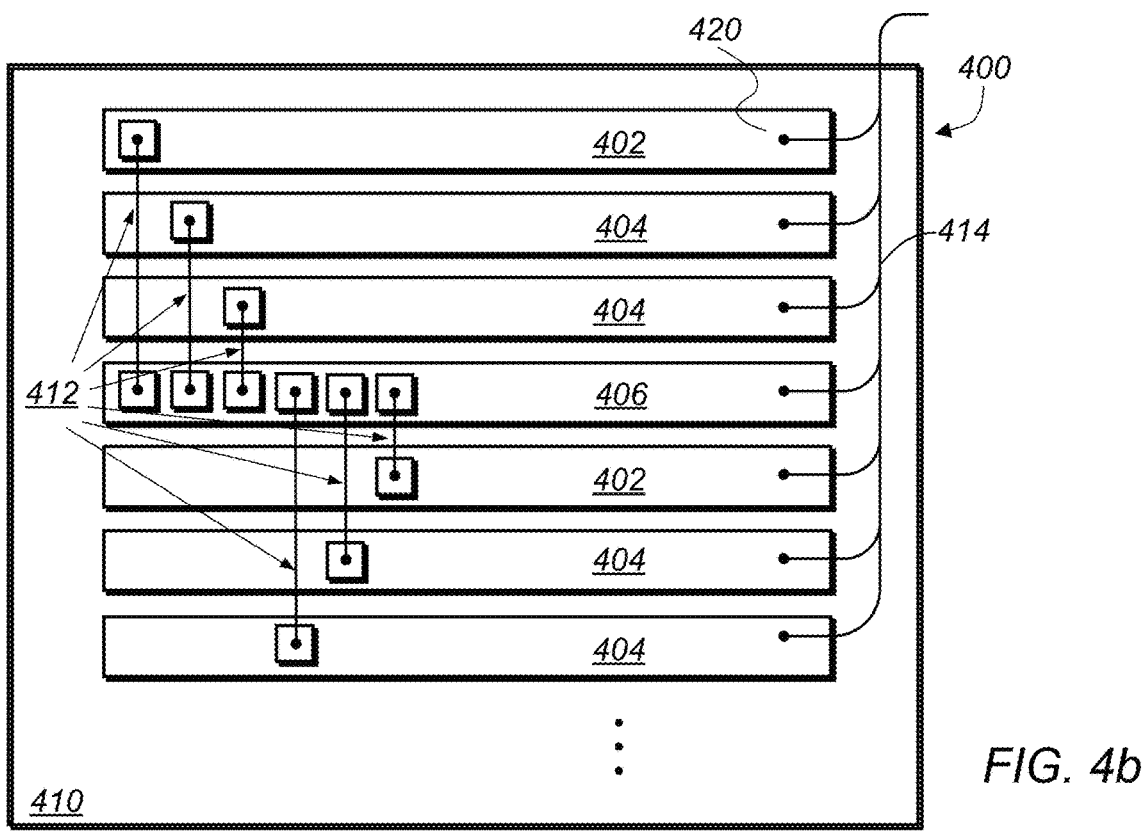
FIG. 4b illustrates, a view of hardware acceleration devices and a switch mounted in a rack, according to some embodiments.

In some embodiments, modular hardware acceleration devices and modular controllers may be mounted in slots of a server rack and coupled together via connectors, such as by using cables connected to respective external ports of the modular hardware acceleration devices and modular controllers or by using backplane interconnects mounted to the server rack. FIGS. 4a-b illustrate various views of hardware acceleration devices, controllers and optional switches mounted in a rack, according to some embodiments. System 400 includes modular hardware acceleration devices 404 mounted in rack 410 along with modular controllers 402. Cables or backplane interconnects 412 couple together modular hardware acceleration devices 404 and modular controller 402. Cables 414 may couple various modular components to an external health monitoring and management system (not shown). Ellipses are shown in FIG. 4a-b to indicate that rack 410 may include more or less hardware acceleration devices and more or less modular controllers grouped together to form more or less particular processing systems.

FIG. 4a illustrates a switch-less multi-host processing system configuration, such as multi-host processing system 100 as shown in FIG. 1a, in some embodiments. Cables or backplane interconnects 412 may couple together modular hardware acceleration devices 404 and modular controller 402 in a daisy-chain fashion, with an additional cable or backplane interconnect 412, in some embodiments, creating a closed loop, or ring configuration, as discussed below in FIG. 5. FIG. 4b illustrates multi-host processing system configuration with switches, such as multi-host processing system 100 as shown in FIG. 1b and FIG. 1c, in some embodiments. Cables or backplane interconnects 412 may couple together modular hardware acceleration devices 404 and modular controller 402 to one or more switches 406

In some embodiments, management systems of modular hardware acceleration devices and modular controllers may be commonly controlled by a local or remote system. For example, modular hardware acceleration devices 404, modular controllers 402 and switches 406 may include a management and control circuit configured to communicate with an external health monitoring and management system via cable(s) 414. For example, management and control ports 420 may enable modular hardware acceleration devices 404, modular controllers 402 and switches 406 to send and receive management and health monitoring signals, such as device temperatures, and instructions to power on and power off respective modular hardware acceleration devices and modular controllers. In some embodiments, modular hardware acceleration devices 404, modular controllers 402 and switches 406 may communicate management and health monitoring information according to intelligent management platform interface (IPMIP) standards via management and control ports 420. In some embodiments, modular hardware acceleration devices 404, modular controllers 402 and switches 406 may communicate self-diagnostics and/or power-on diagnostics to an external health monitoring and management system as part of management and health monitoring information. In this way, the external health monitoring and management system may intelligently manage various modular components of the system to improve function and availability of the system.

In some embodiments, a modular hardware acceleration device may have a height that occupies a 1 U slot in a standard 19" rack. For example, each of modular hardware acceleration devices 404 and 408 may be mounted in 1 U slots in rack 410. Modular hardware acceleration devices 404 and 408 may be any of the modular hardware acceleration devices described in FIGS. 1-3.

In some embodiments, hardware accelerators of modular hardware acceleration devices may be coupled together in various topologies, such as a ring topology, a fan-out topology, a tree topology, or various other suitable topologies. For example, modular hardware acceleration devices 404 and modular controller 402 of particular processing system 416 are coupled together in a ring-topology such as is shown in FIG. 4a. Note that cables or backplane interconnects 412 connect modular controller 402 to a first one of modular hardware acceleration devices 404 and a last one of modular hardware acceleration devices, so that collectively modular controller 402 is configured in a ring with modular hardware acceleration devices 404.

In embodiments in which a modular controller and modular hardware acceleration devices are connected in a ring-topology, cables connecting modular hardware acceleration devices may form a redundant ring topology and the hardware accelerators of each hardware acceleration device coupled to an interconnect switch of the hardware acceleration devices may form branches off of the ring topology.

It should be understood that while the exemplary components shown in FIGS. 4a-b are Interconnected Via Cabling or Backplane Interconnects, in Various Embodiments either front-mounted configurations, rear-mounted configurations or a combination thereof may be envisioned. For example, rear-mounted cabling ports or a combination of front and rear ports may be used while in other embodiments a backplane arrangement rather than cables may be employed. The example embodiment shown in FIGS. 4a-4b is merely one example and is not intended to be limiting.

Figure 5:
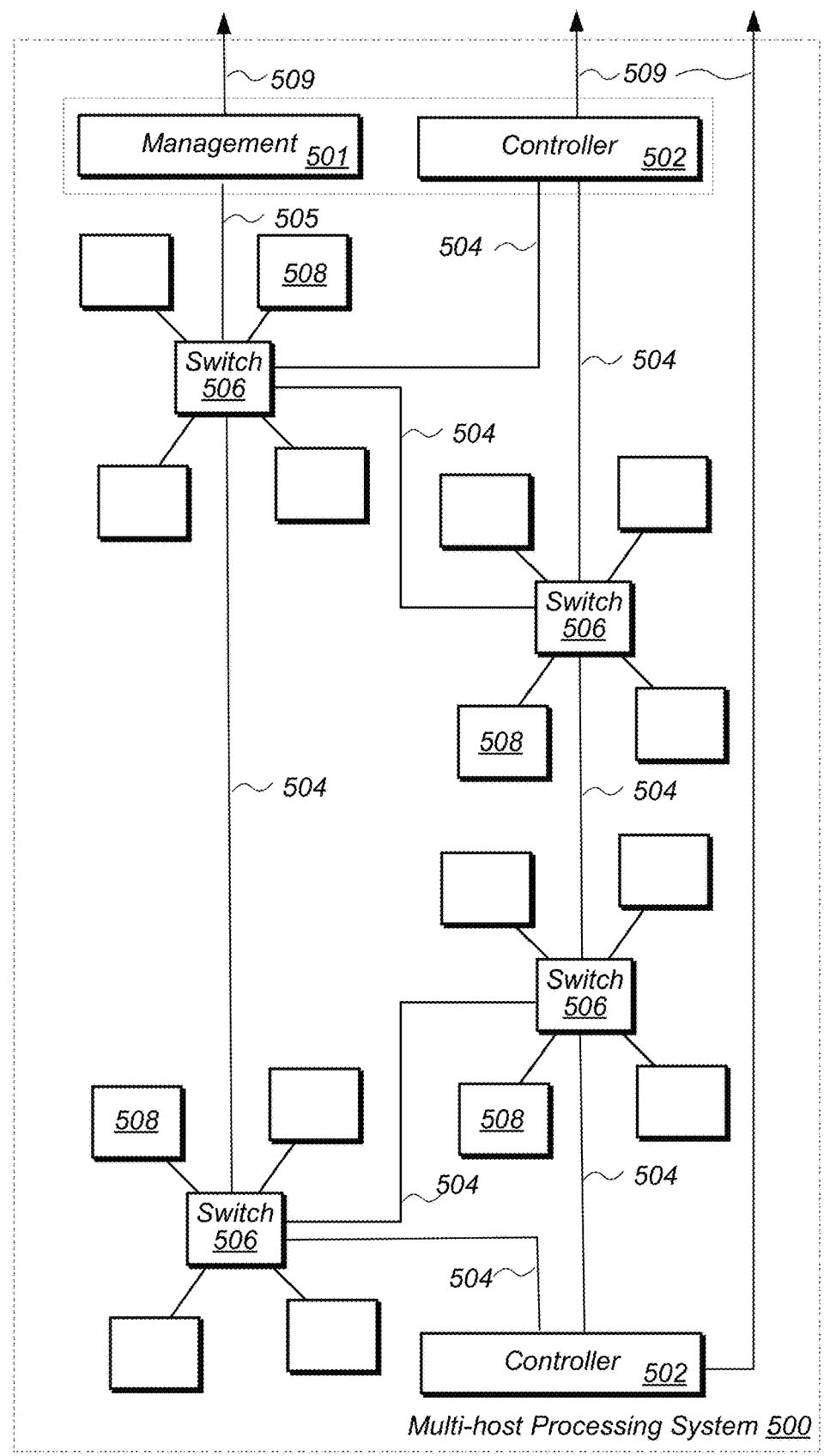
FIG. 5 illustrates hardware accelerators of coupled hardware acceleration devices that form a ring topology of hardware accelerators, according to some embodiments.

For example, FIG. 5 illustrates hardware accelerators of coupled hardware acceleration devices that form a ring topology of hardware accelerators, according to some embodiments. A multi-host processing system 500, such as the multi-host processing system 100 as shown in FIG. 1a, may include modular controllers 502, in some embodiments. Modular controller 502 may be a central processing unit or CPU server. Coupled to controllers 502 via cables 504, that form a redundant ring structure for system 500, are interconnect switches 506. In some embodiments, controllers 502 may each be coupled to the ring structure via multiple cables 504 to one or more interconnect switches 506. Hardware accelerators 508 are coupled to respective interconnect switches 506 and form branches off of the ring formed by cables 504. In some embodiments, a modular hardware acceleration device may include more than two external ports. In such embodiments, modular hardware acceleration devices may be coupled together in a ring topology. A management controller 501, such as the health monitoring and management system 130 as shown in FIG. 1a, is coupled to one or more interconnect switches 506 via cable(s) 505. In some embodiments, the management controller 501 may be incorporated into a controller 502 and share a connection to one or more interconnect switches 506 via cable(s) 504. In addition, the management controller 501 and controller 502 may be connected to an external network through cables 509.

In embodiments, in which a modular controller and modular hardware acceleration devices are connected in a fabric topology, cables or backplane interconnects connecting modular hardware acceleration devices may form a fabric topology and the hardware accelerators of each hardware acceleration device coupled to an interconnect switch of the hardware acceleration devices may form branches off of the fabric topology.

Figure 6:
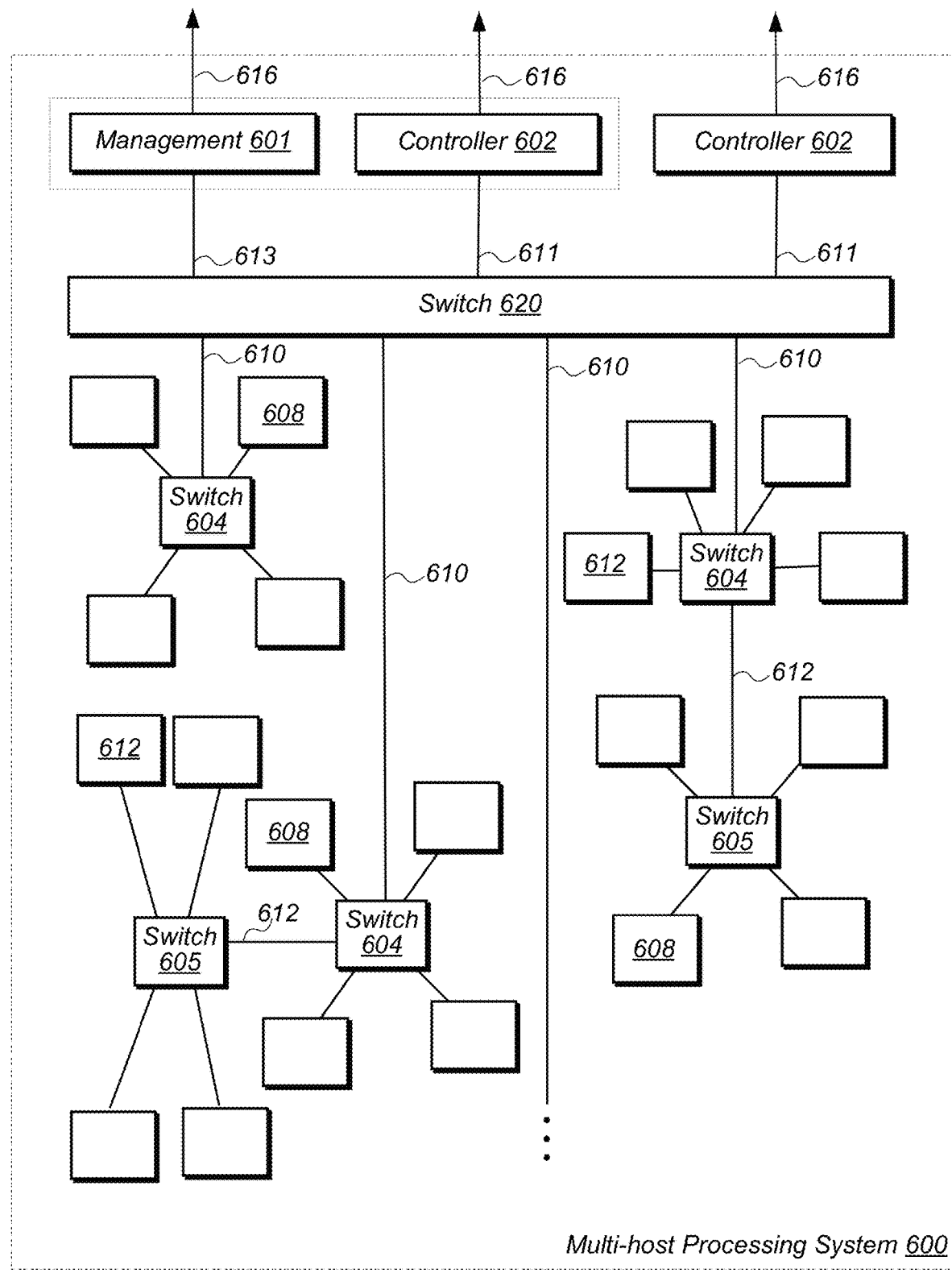
FIG. 6 illustrates hardware accelerators of coupled hardware acceleration devices that form a fabric topology of hardware accelerators, according to some embodiments.

For example, FIG. 6 illustrates hardware accelerators of coupled hardware acceleration devices that form a fabric topology of hardware accelerators, according to some embodiments. System 600 includes modular controllers 602 connecting via cables or backplane interconnects 611 to upstream ports of a switch 620, such as the upstream ports 114 of a PCIE fabric switch 130 as shown in FIG. 1b, of a fabric topology of system 600. Interconnect switches 604 are coupled via cables or backplane interconnects 610 of downstream fabric ports, such as the fabric expansion ports 112 as shown in FIG. 1a, with hardware accelerators 608 connecting directly to switches 604, such as the switches 122 as shown in FIG. 1b. In some embodiments, various other topologies with various other layers and numbers of hardware acceleration devices may be formed by coupling together hardware acceleration devices via external ports of the hardware accelerations devices. In some embodiments, additional switches 605 may connect to switches 604 via cables or backplane interconnects 612 to form hierarchical topologies, with hardware accelerators 612 connecting directly to switches 605. A management controller 601, such as the health monitoring and management system 130 as shown in FIG. 1b, may be coupled to one or more interconnect switches 620 via cable(s) 613. In some embodiments, the management controller 601 may be incorporated into a controller 602 and share a connection to one or more interconnect switches 620 via cable(s) 611. In addition, the management controller 601 and controller 602 may be connected to an external network through cables 616.

In some embodiments, hardware accelerators of hardware acceleration devices are directly connected peer-to-peer with hardware accelerators of commonly coupled hardware acceleration devices. For example, any of the hardware accelerators shown in FIGS. 1, 4, 5 and 6 may be directly connected peer-to-peer with any other one of the hardware accelerators shown in FIGS. 1, 4, 5 and 6.

Figure 7:
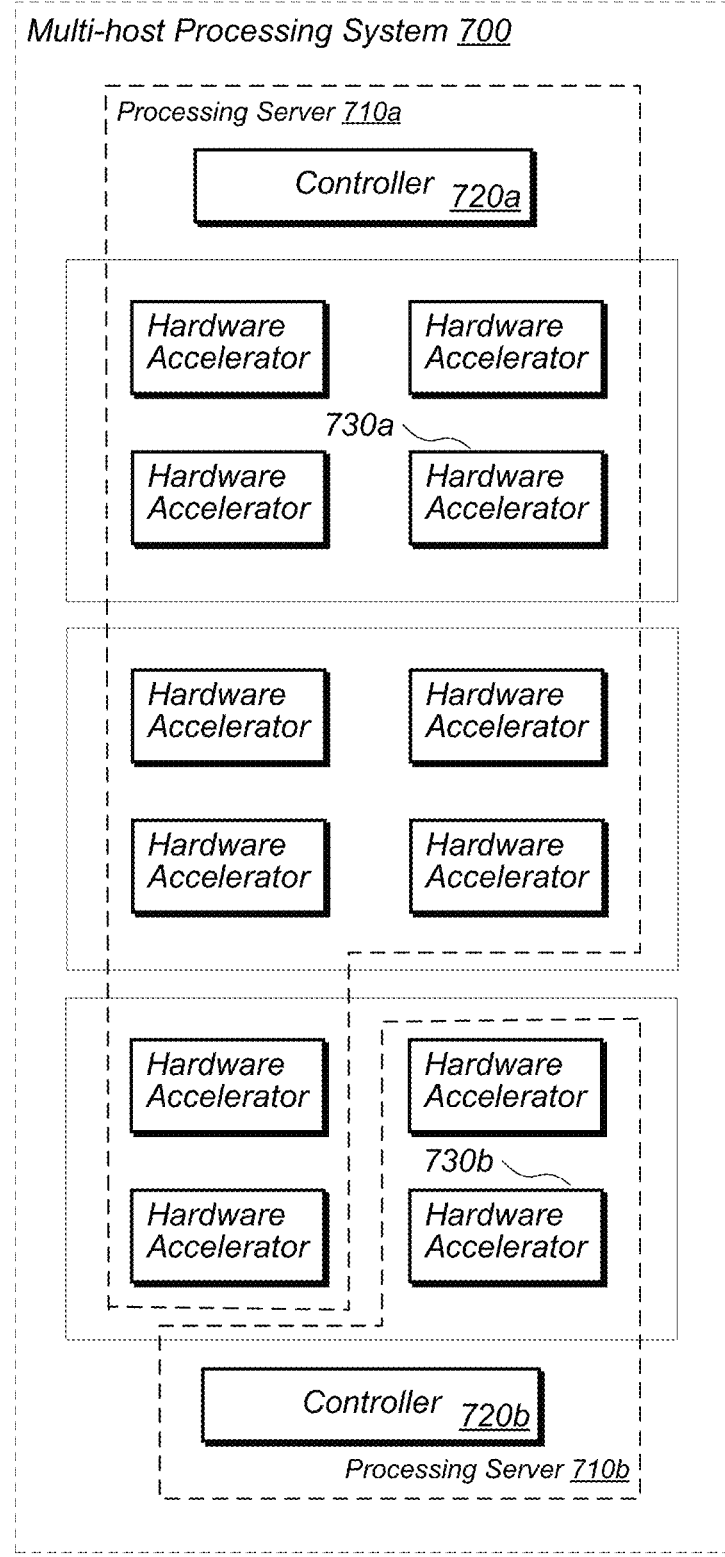
FIG. 7 illustrates a multi-host processing system that provides multiple processing servers with different numbers of hardware accelerators, according to some embodiments.

FIG. 7 illustrates a multi-host processing system that provides multiple processing servers with different numbers of hardware accelerators, according to some embodiments. In some embodiments, a multi-host processing system 700, such as the multi-host processing system 100 as shown in FIG. 1a, may include multiple modular controllers 720, such as the modular controllers 110 as shown in FIG. 1a. A management controller (not shown), such as the health monitoring and management system 130 as shown in FIG. 1a, may provide monitoring and management capabilities for the multi-host processing system 700.

The management controller for the multi-host processing system 700 may determine, in some embodiments, to configure the multi-host processing system 700 to provide one or more multiple processing servers 710, such as the processing servers 710a and 710b. To configure a processing server 710, such as the processing server 710a or 710b, the management server may assign a controller 720, such as controller 720a or 720b, and one or more sets of hardware accelerators, such as respective hardware accelerators 730a or 730b. Examples of such hardware accelerators include hardware accelerators 140 of FIG. 1a. Different processing servers may be configured with one or more sets of hardware accelerators and different processing servers may be assigned sets with differing numbers of hardware accelerators to provide different processing capabilities and to maximize utilization of computational and accelerator resources.

Furthermore, responsive to a reconfiguration event, such as may be caused, for example, by determination of changing computational demand, resource utilization or administrative or client request submitted through a programmatic interface, the management controller may reconfigure the multi-host processing system to provide a different number of processing servers or reconfigure processing servers by adding or subtracting hardware accelerators or sets of hardware accelerators to existing processing servers. The management controller may, in some embodiments, further reconfigure the multi-host processing system responsive to a detected failure event using reserved or standby controllers 720 and/or hardware accelerators 730 to ensure high availability of the processing server(s) 710.

Figure 8:
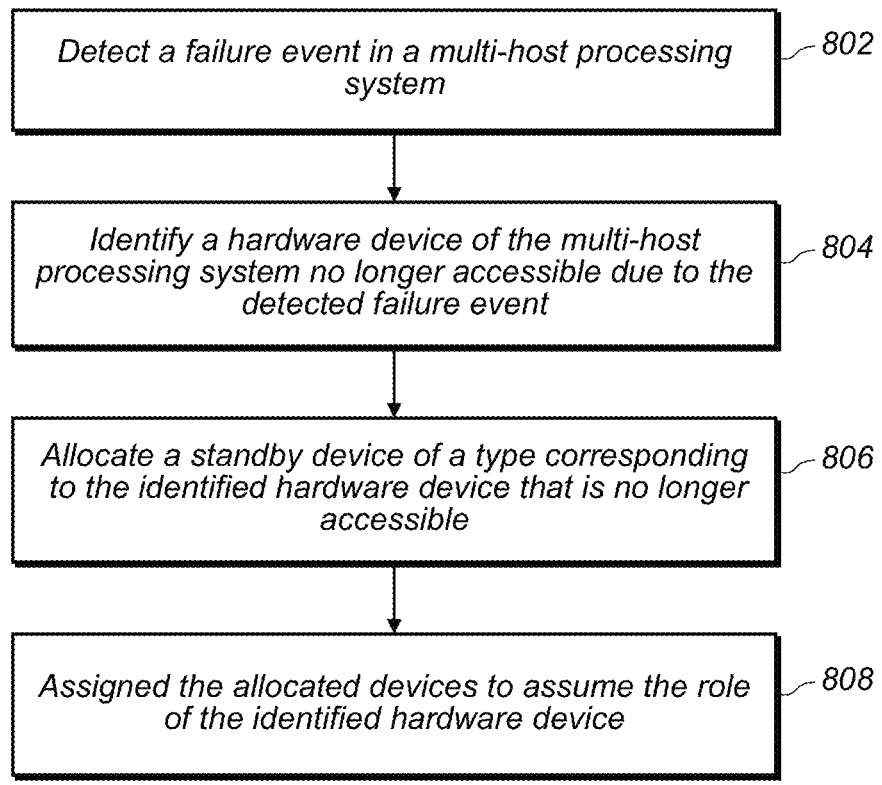
FIG. 8 illustrates a process of recovering from a detected failure event, according to some embodiments.

FIG. 8 illustrates a process of recovering from a detected failure event, according to some embodiments. At 802 a failure event that results in a particular resource of a multi-host processing system becoming inaccessible may be detected. This resource may be, for example, a hardware accelerator device such as a hardware accelerator 140 as shown in FIG. 1a or a modular controller such as the modular controller 110 of FIG. 1a. While the failure detection may be due to a particular resource becoming inaccessible, it should be understood that the failure event may be due to any number of failures, including, for example, power failures, human error, failures of cables such as the cables 122 and 124 of FIG. 1a, or failure of switches such as the switches 122 of FIG. 1a. These examples of failures are not intended to be limiting and any number of failures resulting in inaccessibility of a particular resource may be imagined.

These failures may be detected in a variety of ways in various embodiments. For example, failures may be detected directly by a management system such as the health monitoring and management system 130 as shown in FIG. 1a. The failure may be detected by a failure to receive a keep-alive signal or watchdog signal in various embodiments or may be detected through client reporting in other embodiments. These examples of failure detection are not intended to be limiting and any number of failure detection mechanisms may be employed.

At 804, a type and capabilities of the hardware device rendered inaccessible by the detected failure event may be identified, in various embodiments. At 806, a standby or unallocated hardware device within the multi-host system may be allocated that meets or exceeds the type and capabilities of the inaccessible hardware resource, in some embodiments. For example, if the inaccessible resource is a GPU, a standby GPU with at least the processing capability of the inaccessible GPU may be identified. In another example, if the inaccessible resource is a modular controller, a modular controller with at least the processing capability of the inaccessible modular controller may be identified.

At 808, the allocated standby device may be configured to assume the role of the detected inaccessible device, in some embodiments. For example, if the inaccessible resource is a GPU, the allocated standby GPU may be assigned to the affected processing server to replace the inaccessible GPU to restore the processing capability of the processing server. In another example, if the inaccessible resource is a modular controller, the allocated standby modular controller may be configured to assume the role of the inaccessible primary controller of the affected processing server. In this case, in some embodiments, this may result in the affected processing server being restarted while in other embodiments, the allocated standby modular controller may have been previously configured to monitor, or mirror, actions of the primary controller such that it may assume the role of the primary controller without necessitating a restart of the affected processing server. These examples, however, are not intended to be limiting and various assignment and configuration techniques may be employed to recover from the detected failure event, in various embodiments.

Figure 9:
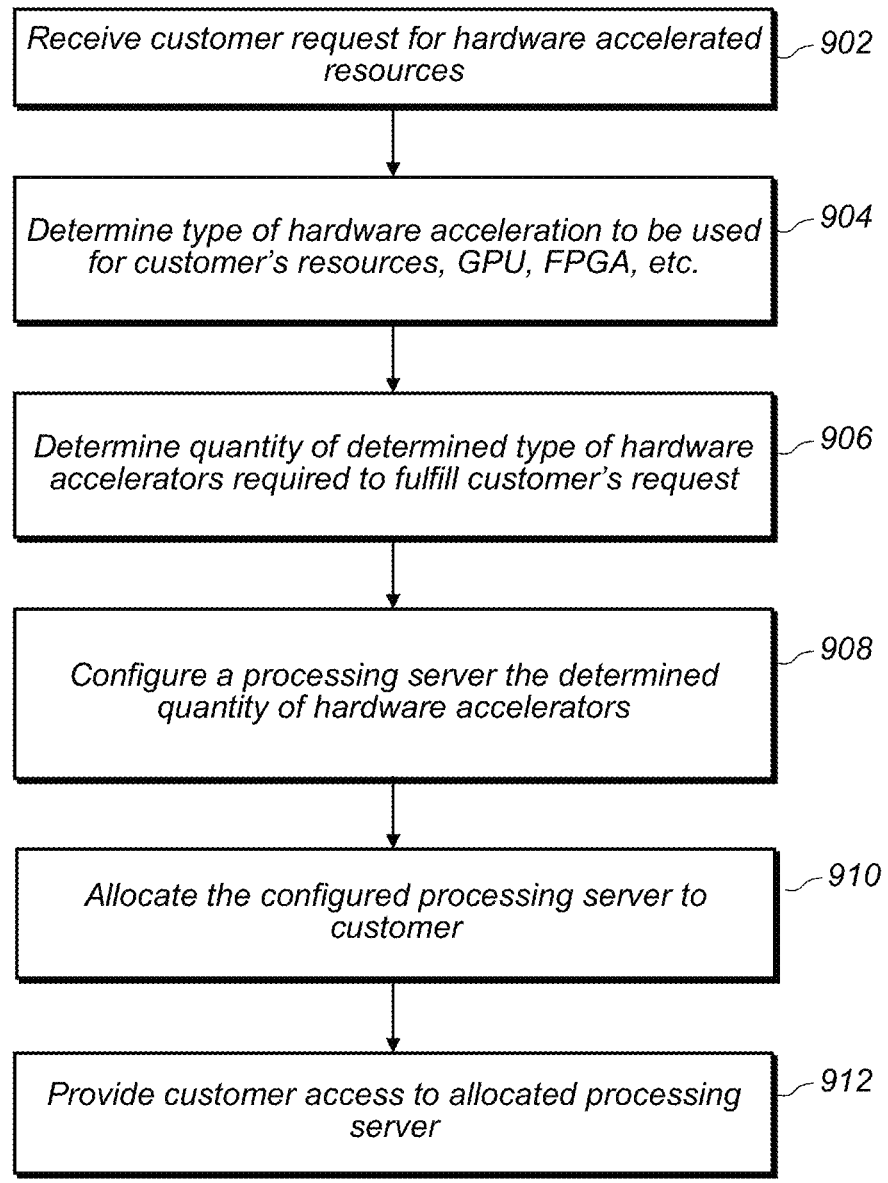
FIG. 9 illustrates a process of allocating hardware accelerator capacity, according to some embodiments.

FIG. 9 illustrates a process of allocating hardware acceleration capacity, according to some embodiments. At 902, a customer request for hardware accelerated resources is received. For example, a customer request may indicate the customer requests a processing system with processing capacity equivalent to 8 GPUs.

At 904, it is determined the type of hardware acceleration requested by the customer. For example, it may be determined that the customer request hardware accelerated resources with GPUs, FPGAs, machine-learning accelerators, storage accelerators, cryptographic acceleration circuits, ASICs, systems on a chip (SoC), or general-purpose processors or some other type of hardware accelerators.

At 906, the quantity of the determined type of hardware accelerators needed to fulfill the customer's request is determined. In some embodiments, a customer may specify a number of hardware accelerators to be included in a processing system to be allocated to the customer. In some embodiments, a customer may specify a performance metric, such as a capability to process a certain type of data in a certain amount of time, and the service provider may determine the type and quantity of hardware accelerators that are needed to fulfill the customer's request. The type and quantity of the accelerators may be based on, for example, historical data, workload-simulation data, or both. In some embodiments the quantity of hardware accelerators needed to fulfill the customer's request may be determined in other manners.

At 908, a particular processing server may be configured with the determined type and quantity of hardware accelerators. In some embodiments, a management system, such as the health monitoring and management system 130 as shown in FIG. 1a, may allocate a modular controller, such as the modular controllers 110 of FIG. 1a, and one or more sets of the determined type and quantity of hardware accelerators from one or more pools of accelerators, such as the hardware accelerators 140 of FIG. 1a, to create the particular processing server, such as the processing servers 710a as shown in FIG. 7.

The management system may maintain a directory of, for example, processing capabilities of the modular controllers included in the multi-host processing system, the types of hardware accelerators included in the multi-host processing system and the quantity of hardware accelerators included in the multi-host processing system.

At 910, after a particular processing server is configured to fulfill the customer's request, the processing system may be allocated to the customer. For example, the processing system may be marked in the service provider's directory as being allocated to the customer.

At 912, the customer may be provided access to the allocated processing system. For example, the processing system may be made available to the customer as a virtual machine implemented on physical hardware having the processing capabilities requested by the customer. In some embodiments, the processing system may be provided for exclusive use by the customer without being shared with other customers of the service provider.

Figure 10:
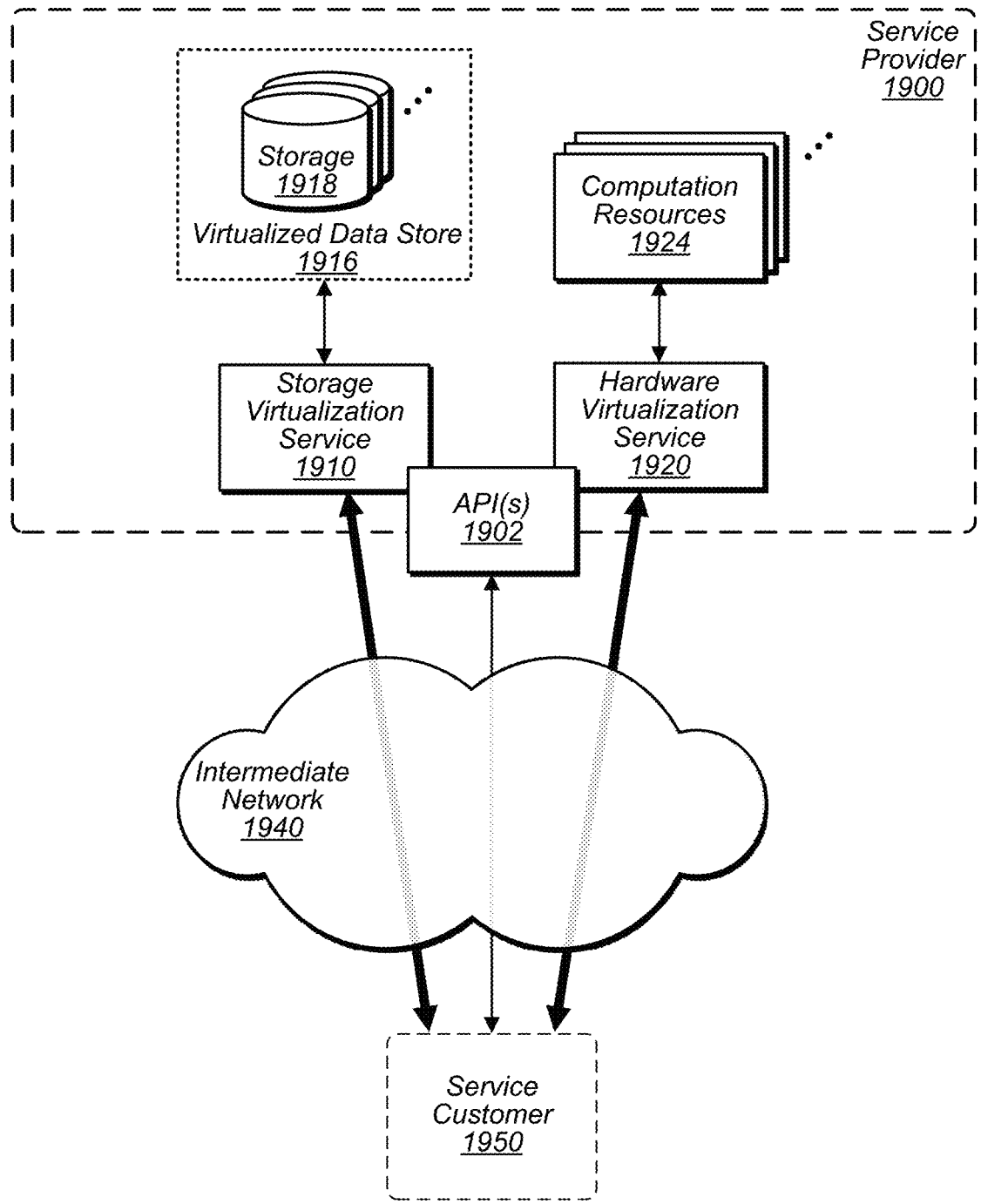
FIG. 10 illustrates a block diagram of a service provider network that implements storage and computation resources available to customers of the service provider, according to some embodiments.

FIG. 10 is a block diagram of an example service provider network that provides a storage virtualization service and a hardware virtualization service to customers, according to some embodiments. Any of the particular processing systems described above that include modular hardware acceleration devices may be provided to a customer of a service provider network as a hardware virtualization service. Hardware virtualization service 1920 provides multiple computation resources 1924 (e.g., VMs, which may be implemented on particular processing systems that include modular hardware acceleration devices) to customers. The computation resources 1924 may, for example, be rented or leased to customers of the service provider 1900 (e.g., to service customer 1950).

Service provider 1900 may provide a service customer 1950 the ability to implement virtual computing systems via hardware virtualization service 1920 coupled to intermediate network 1940. In some embodiments, hardware virtualization service 1920 may provide one or more APIs 1902, for example a web services interface, via which a service customer 1950 may access functionality provided by the hardware virtualization service 1920. In at least some embodiments, virtualized storage resources at customer 1950 may correspond to a storage resource 1918 of virtualized data store 1916 that is leased, rented, or otherwise provided to customer 1950 via storage virtualization service 1910. In some embodiments, computation resources 1924 may be provided to customer for exclusive use by the customer without using hardware virtualization service 1920.

Figure 11:
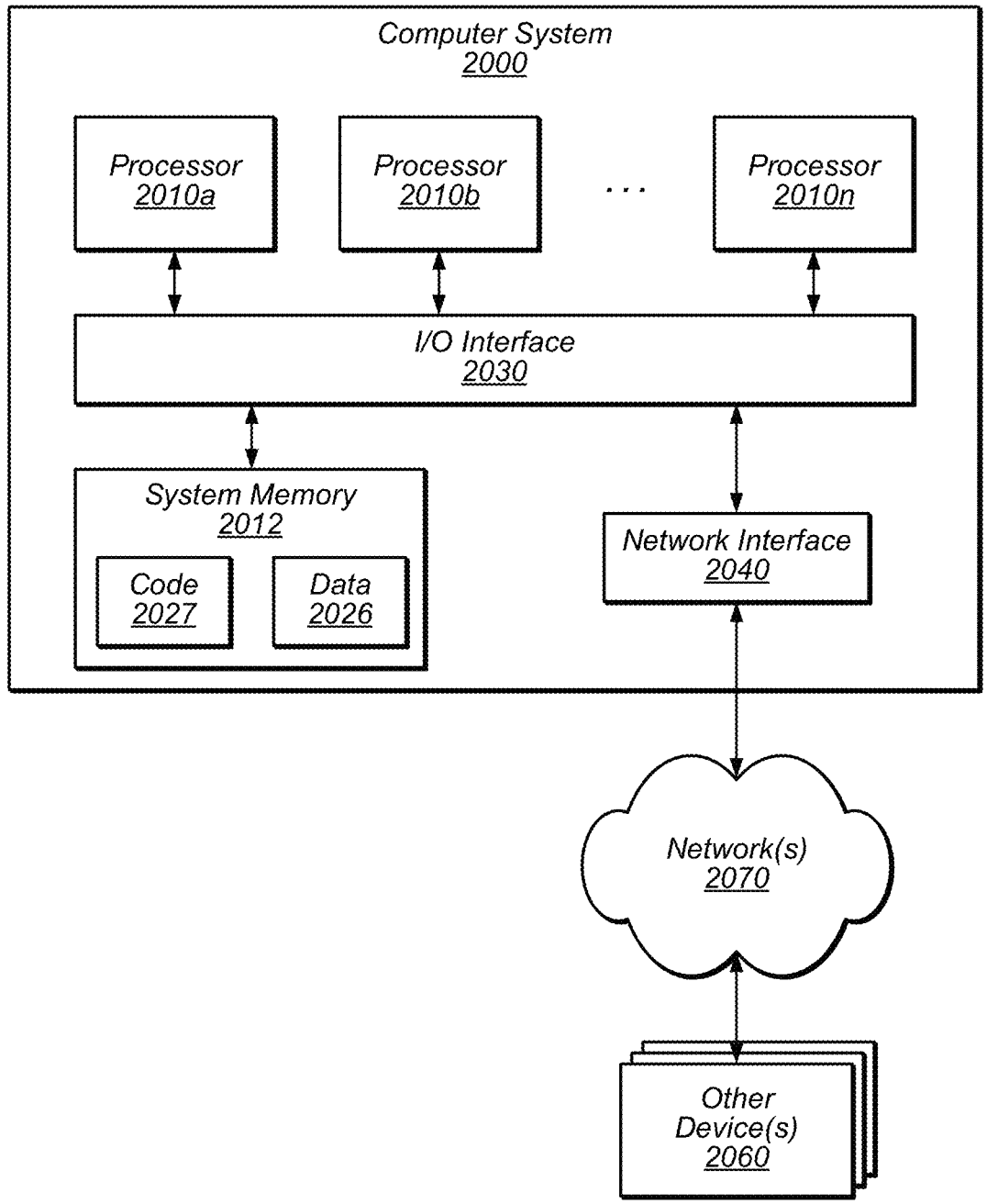
FIG. 11 illustrates a computer system that can be used in a service provider network and/or to at least partly implement a modular controller, according to some embodiments.

In some embodiments, a computer that implements a portion or all of one or more of the technologies, including but not limited to the modular controller and the methods and apparatus for controlling modular hardware acceleration devices as described herein, may include a general-purpose computer system that includes or is configured to access one or more computer-accessible media, such as computer system 2000 illustrated in FIG. 11. In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, various components of the computer system 2000 may be incorporated into a single integrated circuit such as a system-on-chip (SoC).

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2020 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for transferring data over a network, are shown stored within system memory 2020 as code 2025 and data 2026.

In one embodiment, I/O interface 2030 may be configured to coordinate I/O traffic between processor 2010, system memory 2020, and any peripheral devices in the device such as modular hardware acceleration devices coupled with a modular controller, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect Express (PCIe) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 10, for example. In various embodiments, network interface 2040 may support communication via any suitable optical, wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a non-transitory computer-accessible medium configured to store program instructions and data for implementing a particular processing system that includes multiple modular hardware acceleration devices as described above relative to FIGS. 1-10. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

For clarity, devices in many of the figures herein have been shown with a simple box outline around functional components. In various embodiments, a device or a chassis for a device may include an enclosure, a tray, a mounting plate, a combination thereof, as well as various other structural elements.

Although in the embodiments described above, some of the modular hardware acceleration devices have been described as being 1 U in height, modular hardware acceleration devices may in various embodiments be 2 U, 4 U, 5 U, 6 U or any other height or dimensions.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a plurality of modular controllers;
   a plurality of modular hardware acceleration devices, wherein each modular hardware acceleration device comprises:
      a chassis comprising an interconnect switch and a plurality of external ports each communicatively coupled to the interconnect switch; and
      a set of hardware accelerators coupled to the chassis and communicatively coupled to the interconnect switch that connects the hardware accelerators to one another, wherein the set of hardware accelerators comprises general-purpose or specialized processors; and
   connectors that respectively couple the plurality of modular controllers and the plurality of modular hardware acceleration devices with one another via the external ports of the modular hardware acceleration devices to form a processing server with multiple hardware accelerators of two or more of the plurality of modular hardware acceleration devices, wherein a modular controller of the plurality of modular controllers is configured to coordinate operation of the multiple hardware accelerators of the processing server to perform a processing operation using the multiple hardware accelerators of the two or more of the plurality of modular hardware acceleration devices.

2. The system of claim 1, wherein the hardware accelerators are graphics processing units (GPUs), machine-learning acceleration circuits, cryptographic acceleration circuits, field programmable gate arrays (FPGAs), application specific integrated circuits (ASICs), systems on a chip (SoC), storage accelerators or general-purpose processors.

3. The system of claim 1, wherein the processing server comprises a primary controller, and wherein a standby controller is configured to coordinate operation of the multiple hardware accelerators of the processing server responsive to detection of a failure of the primary controller.

4. The system of claim 1, wherein the modular hardware acceleration devices are each mounted in a slot in a rack.

5. A modular hardware acceleration device comprising:
   a chassis comprising a multi-port connection device and a plurality of ports each communicatively coupled to the multi-port connection device; and
   a set of hardware accelerators coupled with the chassis and communicatively coupled to the multi-port connection device, wherein the multi-port connection device connects the hardware accelerators with one another, wherein the set of hardware accelerators comprises general-purpose or specialized processors,
   wherein the modular hardware acceleration device is configured to couple, via respective ones of the plurality of ports, to an additional modular hardware acceleration device and a plurality of modular controllers, wherein a processing server is formed using a given one of the modular controllers and multiple hardware accelerators of at least the modular hardware acceleration device and the additional modular hardware acceleration device, wherein individual ones of the multiple hardware accelerators are respectively configured to be controlled by at least one of the plurality of modular controllers, and wherein the given one of the modular controllers is configured to perform a processing operation using the multiple hardware accelerators of the modular hardware acceleration device and the additional modular hardware acceleration device.

6. The modular hardware acceleration device of claim 5, wherein the set of hardware accelerators respectively comprises graphic processing units (GPUs).

7. The modular hardware acceleration device of claim 5, wherein the set of hardware accelerators respectively comprises machine-learning acceleration circuits.

8. The modular hardware acceleration device of claim 5, wherein the multi-port connection device is an interconnect switch configured to operate in accordance with an ethernet standard.

9. The modular hardware acceleration device of claim 5, wherein the multi-port connection device is an interconnect switch configured to operate in accordance with a peripheral component interconnect express (PCIe) standard, and wherein the plurality of ports comprise one or more switch expansion ports and a plurality of PCIe upstream ports.

10. The modular hardware acceleration device of claim 5, wherein the multi-port connection device is an interconnect switch configured to operate in accordance with an optical standard.

11. The modular hardware acceleration device of claim 5, wherein the hardware accelerators of the hardware acceleration device are configured to communicate peer-to-peer via the multi-port connection device with hardware accelerators of the additional hardware acceleration device.

12. The modular hardware acceleration device of claim 5, wherein the modular hardware acceleration device is further configured to couple to a management controller through a management port, and wherein individual ones of the hardware accelerators are assigned to respective ones of sets of hardware accelerators by the management controller.

13. The modular hardware acceleration device of claim 12, wherein the multi-port connection device is an interconnect switch, and wherein the management port is an out-of-band communication port not communicatively coupled to the interconnect switch.

14. The modular hardware acceleration device of claim 5, wherein the modular hardware acceleration device further comprises a health management circuit configured to communicate with an external health monitoring and management system.

15. A method comprising:
coupling modular hardware acceleration devices with one another via respective ports of the modular hardware acceleration devices, wherein each of the modular hardware acceleration devices comprises:
  a chassis comprising a multi-port connection device and a plurality of ports each communicatively coupled to the multi-port connection device; and
  a set of hardware accelerators coupled with the chassis and each communicatively coupled to the multi-port connection device, wherein the multi-port connection device connects the hardware accelerators with one another, wherein the set of hardware accelerators comprises general-purpose or specialized processors; and
coupling the modular hardware acceleration devices to a plurality of modular controllers, wherein individual ones of the plurality of modular controllers are respectively configured to coordinate operation of the multiple hardware accelerators; and
forming a processing system using a given one of the modular controllers and hardware accelerators of at least two of the modular hardware acceleration devices, wherein the given one of the modular controllers of the processing system is configured to perform a processing operation using the multiple hardware accelerators of the two or more of the modular hardware acceleration devices.

16. The method of claim 15, further comprising:
forming one or more additional processing systems using the modular hardware acceleration devices and the modular controllers;
coupling at least one of the modular hardware acceleration devices to a management controller through a management port; and
assigning, by the management controller, individual ones of at least a portion of the hardware accelerators to respective ones of a plurality of processing systems, the plurality of processing systems comprising the processing system and the one or more additional processing systems.

17. The method of claim 16, further comprising:
assigning, responsive to a reconfiguration event, at least one additional hardware accelerator of the hardware accelerators to a particular processing system of the plurality of processing systems.

18. The method of claim 15, further comprising:
configuring, responsive to detection of a failure of one of the hardware accelerators, a standby hardware accelerator to replace the failed one of the hardware accelerators of the processing system.

19. The method of claim 15, wherein said coupling the modular hardware acceleration devices with one another via the respective ports of the modular hardware acceleration devices comprises coupling the modular hardware acceleration devices together in a ring or mesh topology.

20. The method of claim 15, wherein the hardware accelerators are graphics processing units (GPUs), cryptographic acceleration circuits, machine-learning acceleration circuits, storage accelerators field programmable gate arrays (FPGAs), application specific integrated circuits (ASICs), systems on a chip (SoC), or general-purpose processors.

\* \* \* \* \*